United States Patent
Chang et al.

(10) Patent No.: US 8,072,861 B2
(45) Date of Patent: Dec. 6, 2011

(54) METHOD FOR DETERMINING COMPLETENESS OF OPTICAL DISC AND METHOD FOR PLAYING OPTICAL DISC

(75) Inventors: He-Chi Chang, Taitung County (TW); Lu-Chia Tseng, Hsinchu County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 802 days.

(21) Appl. No.: 11/972,318

(22) Filed: Jan. 10, 2008

(65) Prior Publication Data

US 2009/0109821 A1    Apr. 30, 2009

(30) Foreign Application Priority Data

Oct. 30, 2007   (TW) .............................. 96140809 A

(51) Int. Cl.
*G11B 20/18* (2006.01)
(52) U.S. Cl. ..................... 369/53.24; 369/53.2
(58) Field of Classification Search .................. None
See application file for complete search history.

(56) References Cited

U.S. PATENT DOCUMENTS

| | | | |
|---|---|---|---|
| 5,351,226 A | | 9/1994 | Mizumoto et al. |
| 5,381,392 A | * | 1/1995 | Hira ........................... 369/53.23 |
| 5,414,684 A | * | 5/1995 | Nonaka et al. ................ 369/53.2 |
| 2002/0021633 A1 | * | 2/2002 | Shimamura ................. 369/44.29 |
| 2008/0019233 A1 | * | 1/2008 | Liu et al. ..................... 369/44.23 |

FOREIGN PATENT DOCUMENTS

EP    0 526 017    2/1993

OTHER PUBLICATIONS

Chinese Examination Report of Taiwan Application No. 096140809, dated Apr. 13, 2011.

\* cited by examiner

*Primary Examiner* — Christopher R Lamb
(74) *Attorney, Agent, or Firm* — J.C. Patents

(57) ABSTRACT

A method for determining the completeness of an optical disc and a method for playing the optical disc are provided. The method for playing the optical disc includes: performing focusing on and tracking on the optical disc; detecting whether the optical disc contains any data if the focusing on succeeds while the tracking on fails; if the optical disc contains data, turning on a servo system to perform focusing on and tracking on to the area containing the data and determining whether a file information area contains a file system; if the file information area does not contain any file system, reading the outmost data in a video data area to locate a file allocation data table; and playing the data stored in the video data area according to the file allocation data table.

17 Claims, 8 Drawing Sheets

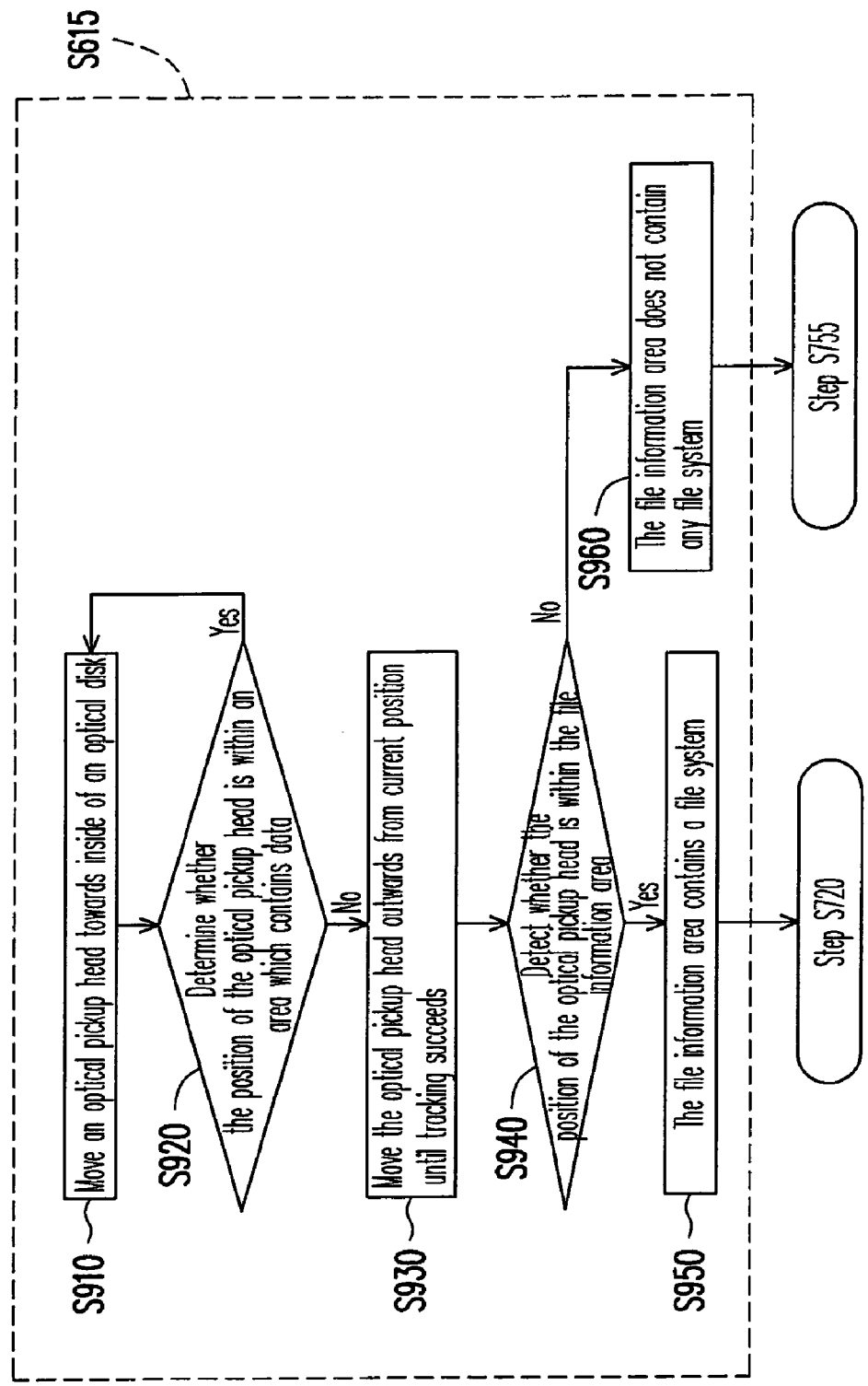

METHOD FOR DETERMINING COMPLETENESS OF OPTICAL DISC AND METHOD FOR PLAYING OPTICAL DISC

CROSS-REFERENCE TO RELATED APPLICATION

This application claims the priority benefit of Taiwan application serial no. 96140809, filed on Oct. 30, 2007. The entirety of the above-mentioned patent application is hereby incorporated by reference herein and made a part of this specification.

BACKGROUND OF THE INVENTION

1. Field of the Invention

The present invention generally relates to a method for playing an optical disc, in particular, to a method for playing a non-finalized optical disc.

2. Description of Related Art

According to the current specification of optical discs, a complete optical disc has a lead-in zone, a lead-out zone, and a data zone. When a read-only optical disc drive first reads an optical disc, the read-only optical disc drive performs focusing and tracking actions by using the lead-in zone of the optical disc. The read-only optical disc drive can only read data recorded in the optical disc after the focusing and tracking actions are performed. The format of a digital versatile disc (DVD) will be described herein as an example. FIG. 1 illustrates the data structure of a DVD. Referring to FIG. 1, the DVD has a lead-in zone 110, a data zone 130, and a lead-out zone 150. The data zone 130 includes a file system area 132, a navigation data area 134, and a video data area 140. When a DVD recorder records a video data into a blank recordable DVD, the DVD recorder first composes the video data into a file and then burns the file into the video data area 140. After that, the DVD recorder performs a finalization action, wherein the DVD recorder composes a file system and a navigation data according to the information of the recorded video data (including the position and directory of the video data in the DVD), writes the file system and the navigation data respectively into the file system area 132 and the navigation data area 134, and then burns data into the lead-in zone 110 and the lead-out zone 150. Since the recordable DVD has been finalized, a read-only optical disc drive or a read-only disc player can track the recordable DVD by using the lead-in zone 110 thereof and play the video data recorded in the recordable DVD according to the file system recorded in the file system area 132.

As to a write-once DVD, data written into the file system area 132 and the navigation data area 134 cannot be changed, namely, the DVD cannot be used for recording any other data. Accordingly, in order to use the storage capacity of a write-once DVD efficiently, a DVD recorder reserves an area at the beginning of the data area as a file system area and a navigation data area. Besides, no finalization action is performed after each time a video data is recorded into the DVD; instead, only the video data and a file allocation data table (for example, a reserved space allocation table (RSAT) or a virtual allocation table (VAT)) are written into the DVD. The DVD is finalized only when its storage capacity is used up. The RSAT contains information of the recorded video data therefore can be used for composing the file system and the navigation data while performing the finalization action or for playing the recorded video data. FIG. 2 illustrates the data structure of a DVD which has been recorded several times. Referring to FIG. 2, the video data area 140 in the DVD contains a plurality of video data 141, 143, and 145 which are sequentially burnt into the DVD by a DVD recorder. Besides, the video data area 140 further contains a plurality of file allocation data tables 142, 144, and 146 respectively recorded after the video data 141, 143, and 145, and these file allocation data tables 142, 144, and 146 respectively record the information of the video data 141, 143, and 145.

As described above, an optical disc to which video data is recorded but the finalization action is not yet performed is referred to as a "non-finalized disc". FIG. 3 illustrates the data structure of a DVD to which video data is recorded only once and the finalization action is not performed yet. Referring to FIG. 3, the video data area 140 in the DVD contains only a video data 141 and a RSAT 142. Since the DVD is not finalized, the lead-in zone 110, lead-out zone 150, file system area 132, and navigation data area 134 are still blank areas containing no data.

A conventional read-only optical disc drive or read-only disc player cannot track on those areas in an optical disc which contain no data. FIG. 4 is a flowchart illustrating how conventionally a read-only optical disc drive plays an optical disc. Referring to FIG. 4, an optical disc playing process is started (step S400), and a servo system of the read-only optical disc drive is turned on (step S410). While the servo system is being turned on, an optical pickup head is moved to the lead-in zone of the optical disc to perform focusing on and tracking on actions. Next, whether the servo system is successfully start-up is determined (step S420). If the servo system is successfully start-up, the read-only optical disc drive starts to read data from the optical disc (step S430). For example, the read-only optical disc drive reads the data recorded in the lead-in zone of the optical disc to obtain the storage capacity of the optical disc and reads the video data recorded in the video data area according to the file system recorded in the file system area. After reading the optical disc, the read-only optical disc drive ends the optical disc playing process (step S440). Contrarily, if it is determined that the servo system is not successfully start-up in step S420, the read-only optical disc drive determines that an operation error occurs (step S450) and terminates the optical disc playing process (step S440). As described above, when a read-only optical disc drive reads a non-finalized disc, since the optical pickup head cannot track an area containing no data, the servo system cannot be successfully start-up, and accordingly the read-only optical disc drive determines that an operation error occurs. As a result, the read-only optical disc drive cannot read the non-finalized disc. Even if the servo system in the read-only optical disc drive is successfully start-up by moving the optical pickup head to the video data area containing video data, the read-only optical disc drive cannot read data from the optical disc because the read-only optical disc drive cannot obtain the storage capacity or other information of the optical disc from the lead-in zone and the file system area. In short, a read-only optical disc drive or a read-only disc player cannot read data from any non-finalized disc.

Additionally, if the finalization action of a DVD recorder or DVD burner is terminated by an interruption (for example, a power failure or insufficient laser power etc) when an optical disc is being burnt, the optical disc cannot be read by a read-only optical disc drive or a read-only disc player because the lead-in zone and the file system area thereof contain no data.

A method and an apparatus for playing a non-finalized disc (partial disc) have been disclosed in U.S. Pat. No. 5,351,226. According to this disclosure, whether the lead-in zone of an optical disc contains data is first detected when the optical disc stays immobile, and then whether the optical disc contains data is determined and the data in the lead-in zone is re-established. The method for detecting whether the optical disc contains data includes following steps. When the optical disc stays immobile, an optical pickup head is moved to the lead-in zone of the optical disc, and a swing signal is loaded into a signal of the optical pickup head for controlling the focusing and tracking actions. Next, the optical pickup head is moved along the normal direction of the tracks on the optical disc. Meanwhile, the signal reflected by the optical disc is read and whether the swing of the signal reaches a predetermined value is detected, so that whether data has been burnt into the lead-in zone and a program area of the optical disc can be determined. If the lead-in zone of the optical disc contains no data but the program area thereof contains data, the size of each track on the optical disc is detected again in order to re-establish a table of contents (TOC) of the optical disc, and then the tracks of the optical disc are played according to the TOC.

However, in the technique described above, data in the optical disc is detected when the optical disc stays immobile. As a result, the optical pickup head cannot be positioned correctly, and accordingly data in the lead-in zone cannot be detected correctly. Besides, foregoing technique can only be applied to a compact disc digital audio (CD-DA) but not to a DVD.

SUMMARY OF THE INVENTION

Accordingly, the present invention is directed to a method for determining the completeness of an optical disc, wherein whether the optical disc is a non-finalized disc is determined by detecting whether the optical disc can seek tracks to a file information area when a servo system is being turned on.

The present invention is directed to a method for playing a non-finalized disc, wherein if an optical disc is determined to be a non-finalized disc, an area containing data in the non-finalized disc is located and focusing and tracking actions are performed to this area, so as to play the video data recorded in the non-finalized disc.

The present invention provides a method for determining the completeness of an optical disc, wherein the optical disc includes a file information area. The method includes: performing a servo system start-up process to the optical disc; if the servo system start-up process fails, detecting whether the optical disc contains data; if the optical disc contains data, performing focusing on and tracking on in an area containing data in the optical disc and determining whether the file information area contains a file system; and if the file information area contains no file system, determining the optical disc to be a non-finalized disc.

The present invention also provides a method for playing an optical disc suitable for a read-only disc player. The optical disc includes a file information area and a video data area. The method includes: performing focusing on and tracking on the optical disc; if the focusing on succeeds while the tracking on fails, detecting whether the optical disc contains data; if the optical disc contains data, performing focusing on and tracking on an area containing data in the optical disc and determining whether the file information area contains a file system; if the file information area contains no file system, reading the outmost data in the video data area in order to locate a file allocation data table; and playing data stored in the video data area according to the file allocation data table.

According to an embodiment of the present invention, the step of detecting whether the optical disc contains data further includes: moving an optical pickup head outwards from inside of the optical disc to read a servo signal; and determining whether the optical disc contains data according to the variation of the servo signal. If it is determined that the optical disc contains data, a servo system is turned on and focusing on and tracking on are performed in an area containing data in the optical disc. The servo signal may be a radio frequency (RF) signal, a RF envelope signal, a sub beam additive signal, or a tracking error signal.

According to an embodiment of the present invention, the step of determining whether the file information area contains a file system further includes: a. confirming the current position of the optical pickup head; b. calculating a predetermined number of tracks from the current position of the optical pickup head to the file information area; c. moving the optical pickup head toward the file information area; d. determining whether the optical pickup head is moved across the predetermined number of tracks; if the optical pickup head is not moved across the predetermined number of tracks yet, determining whether the moving time of the optical pickup head exceeds a predetermined time; if the moving time of the optical pickup head exceeds the predetermined time, determining that the file information area does not contain any file system.

According to an embodiment of the present invention, when the optical pickup head is moved across the predetermined number of tracks, whether the position of the optical pickup head is within the file information area is determined. If the position of the optical pickup head is not within the file information area, steps a, b, c, and d are executed again. If the position of the optical pickup head is within the file information area, it is determined that the file information area contains a file system.

According to an embodiment of the present invention, foregoing step of determining whether the file information area contains any file system includes: moving the optical pickup head toward inside of the optical disc until tracking on fails; moving the optical pickup head from where the tracking on fails toward outside of the optical disc until tracking on succeeds; determining that the file information area contains a file system if the tracking position of the optical pickup head is within the file information area; and determining that the file information area does not contain any file system if the tracking position of the optical pickup head is not within the file information area.

According to an embodiment of the present invention, the optical disc may be a digital versatile disc (DVD).

According to an embodiment of the present invention, the step of locating the file allocation data table includes: moving the optical pickup head toward outside of the optical disc until tracking on fails; moving the optical pickup head toward inside of the optical disc for a particular track number; and locating and reading the file allocation data table. The file allocation data table may be a reserved space allocation table (RSAT) or a virtual allocation table (VAT).

In the present invention, whether the optical disc is a non-finalized disc is detected when a tracking action of the optical pickup head fails, and a mechanism for reading non-finalized discs is started if the optical disc is a non-finalized disc. Therefore, a read-only optical disc drive or a read-only disc player can read data from the optical disc regardless of the completeness of the optical disc.

BRIEF DESCRIPTION OF THE DRAWINGS

The accompanying drawings are included to provide a further understanding of the invention, and are incorporated in and constitute a part of this specification. The drawings

FIG. 9 is another flowchart of detailed steps in step S615 in FIG. 6.

DESCRIPTION OF THE EMBODIMENTS

Figure 1:
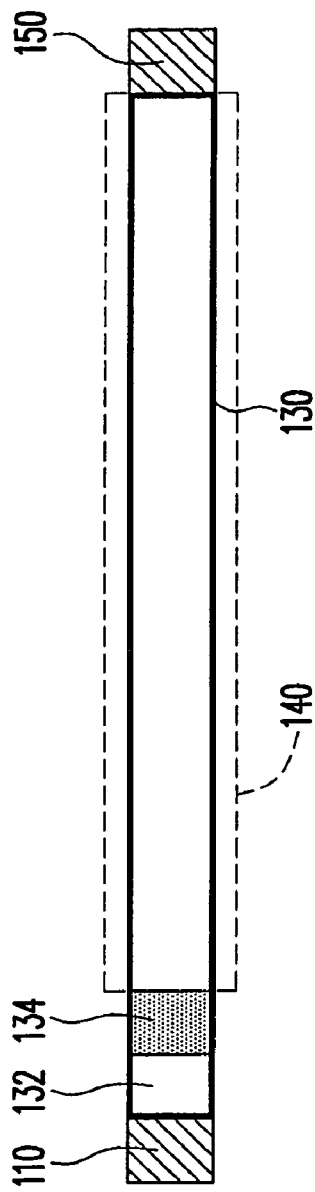
FIG. 1 illustrates the data structure of a digital versatile disc (DVD).
Figure 2:
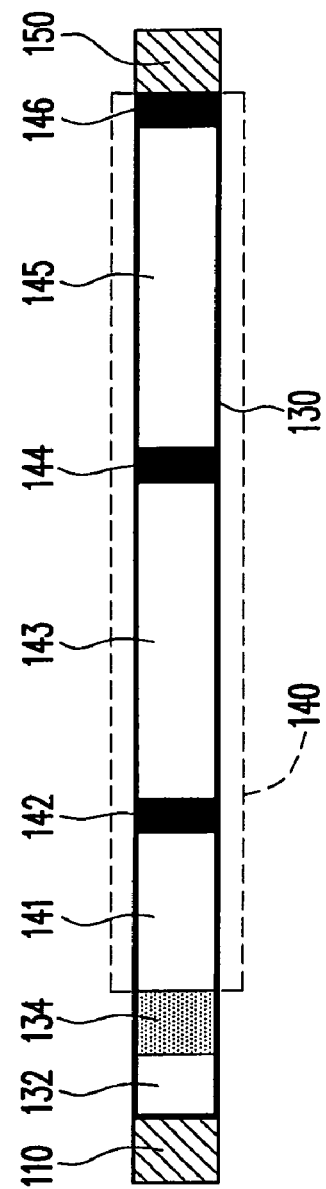
FIG. 2 illustrates the data structure of a DVD which has been recorded several times.
Figure 3:
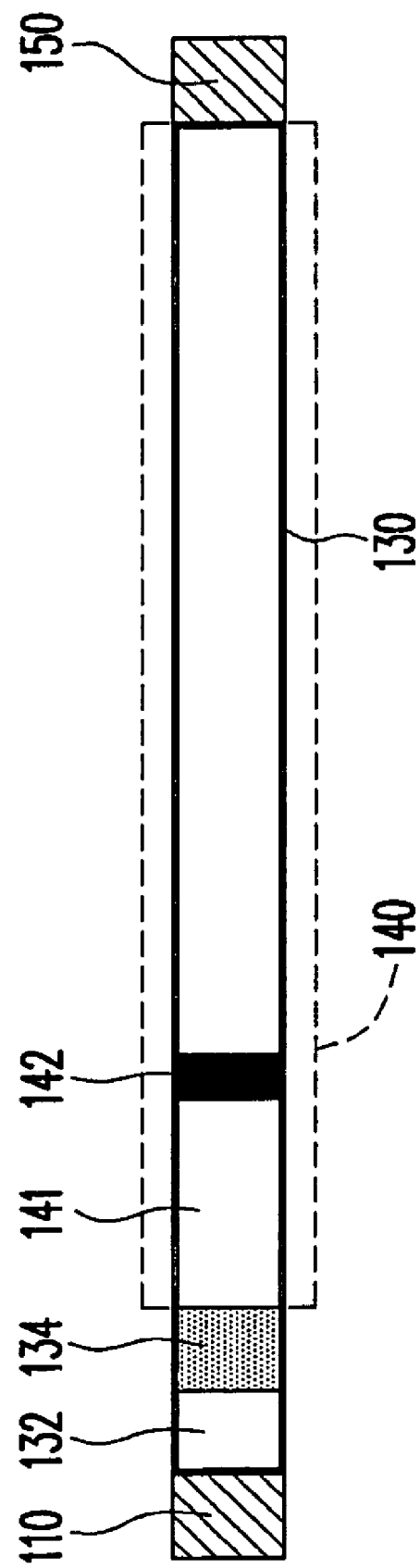
FIG. 3 illustrates the data structure of a DVD to which video data is recorded only once and the finalization action is not performed yet.
Figure 4:
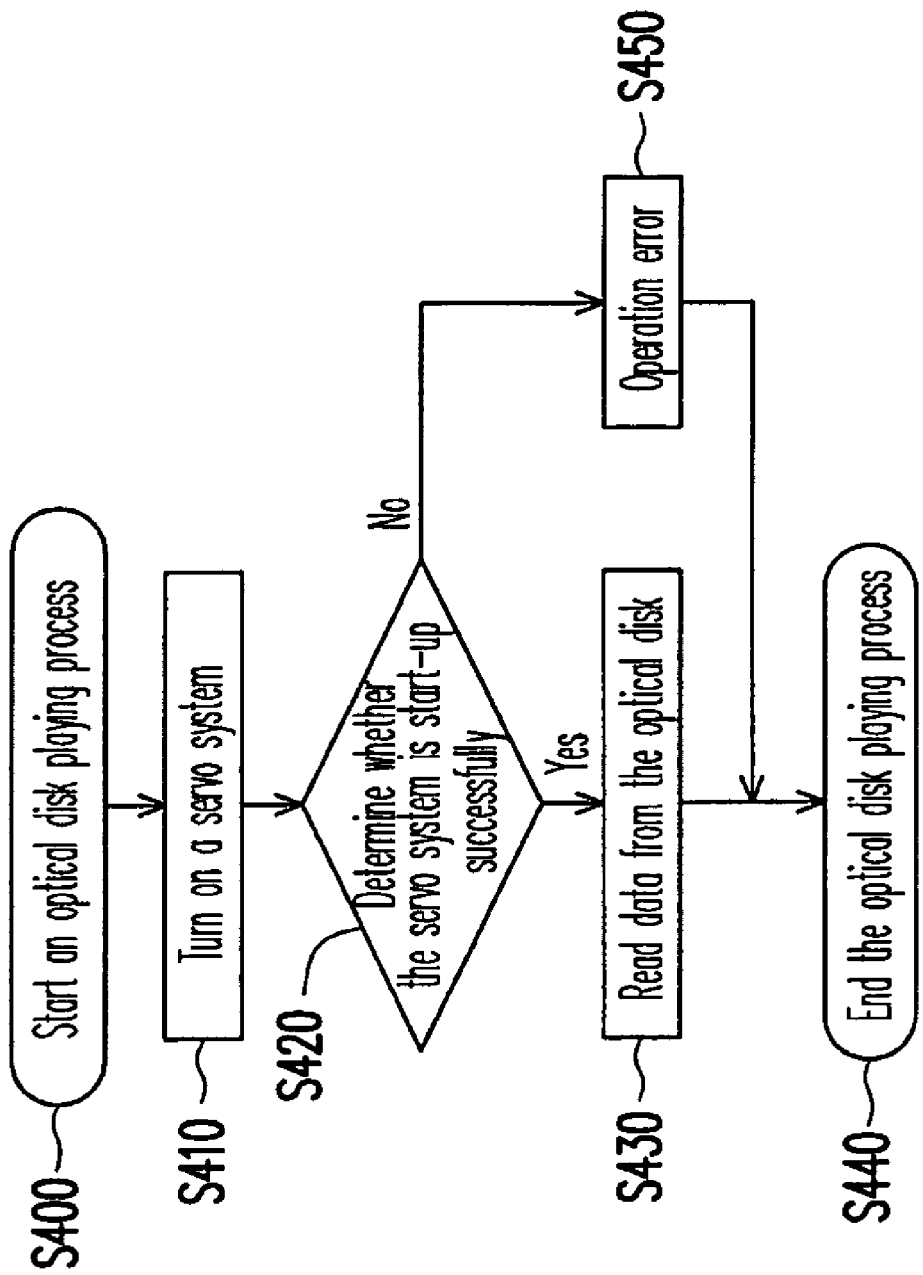
FIG. 4 is a flowchart illustrating a conventional method which a read-only optical disc drive plays an optical disc.

Reference will now be made in detail to the present preferred embodiments of the invention, examples of which are illustrated in the accompanying drawings. Wherever possible, the same reference numbers are used in the drawings and the description to refer to the same or like parts.

The present invention provides a method for determining the completeness of an optical disc and a method for playing a non-finalized optical disc. According to the present invention, a mechanism for determining the completeness of an optical disc is brought in after a servo system is turned on so as to determine whether the optical disc is a non-finalized disc. If the optical disc is a non-finalized disc, a playing mechanism is started to play this non-finalized disc. Thus, the methods provided by the present invention not only allow a read-only optical disc drive or a read-only disc player to determine the completeness of an optical disc, but also allow the read-only optical disc drive or the read-only disc player to use another playing method to play the optical disc when the optical disc is determined to be a non-finalized disc. Namely, the methods provided by the present invention allow a read-only optical disc drive or a read-only disc player to play a non-finalized disc.

Figure 5:
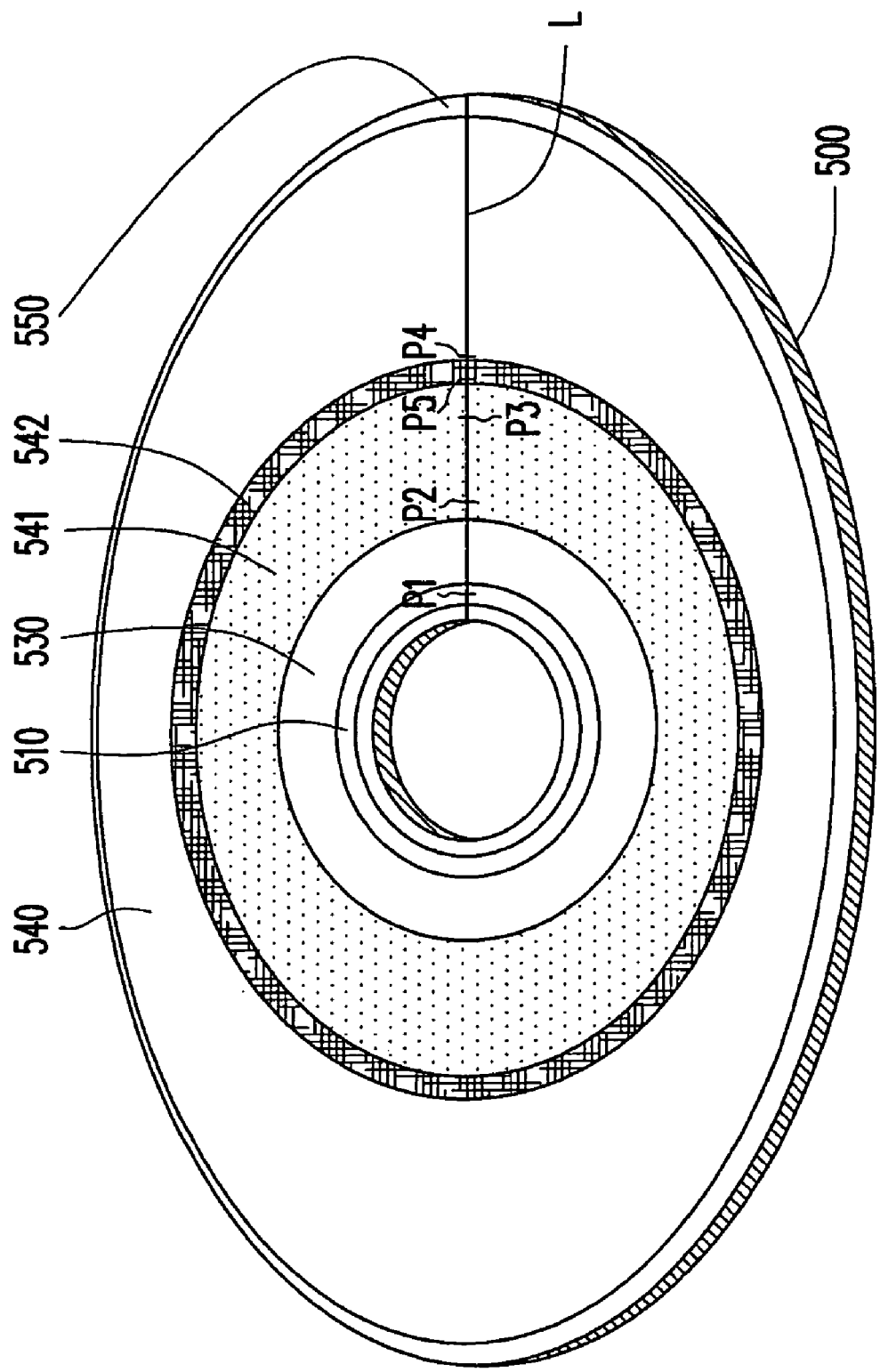
FIG. 5 illustrates the data distribution in an optical disc.

In an embodiment of the present invention, a read-only optical disc drive or a read-only disc player reads a non-finalized disc in digital versatile disc (DVD) format (for example, a DVD-R or a DVD+R), namely, a DVD to which no finalization action is performed. FIG. 5 illustrates the data distribution of the non-finalized disc. Referring to FIG. 5, the non-finalized disc 500 includes a lead-in zone 510, a lead-out zone 550, a file information area 530, and a video data area 540 located between the file information area 530 and the lead-out zone 550. Taking current DVD format as an example, the file information area 530 includes a file system area and a navigation data area.

A video data 541 and a file allocation data table 542 corresponding to the video data 541 have been recorded into the video data area 540 of the non-finalized disc 500. An optical pickup head of the read-only optical disc drive or the read-only disc player is moved along a normal L of the optical disc as illustrated in FIG. 5 in order to read data in the optical disc. In other words, the moving track of the optical pickup head may be the normal L in FIG. 5.

Figure 6:
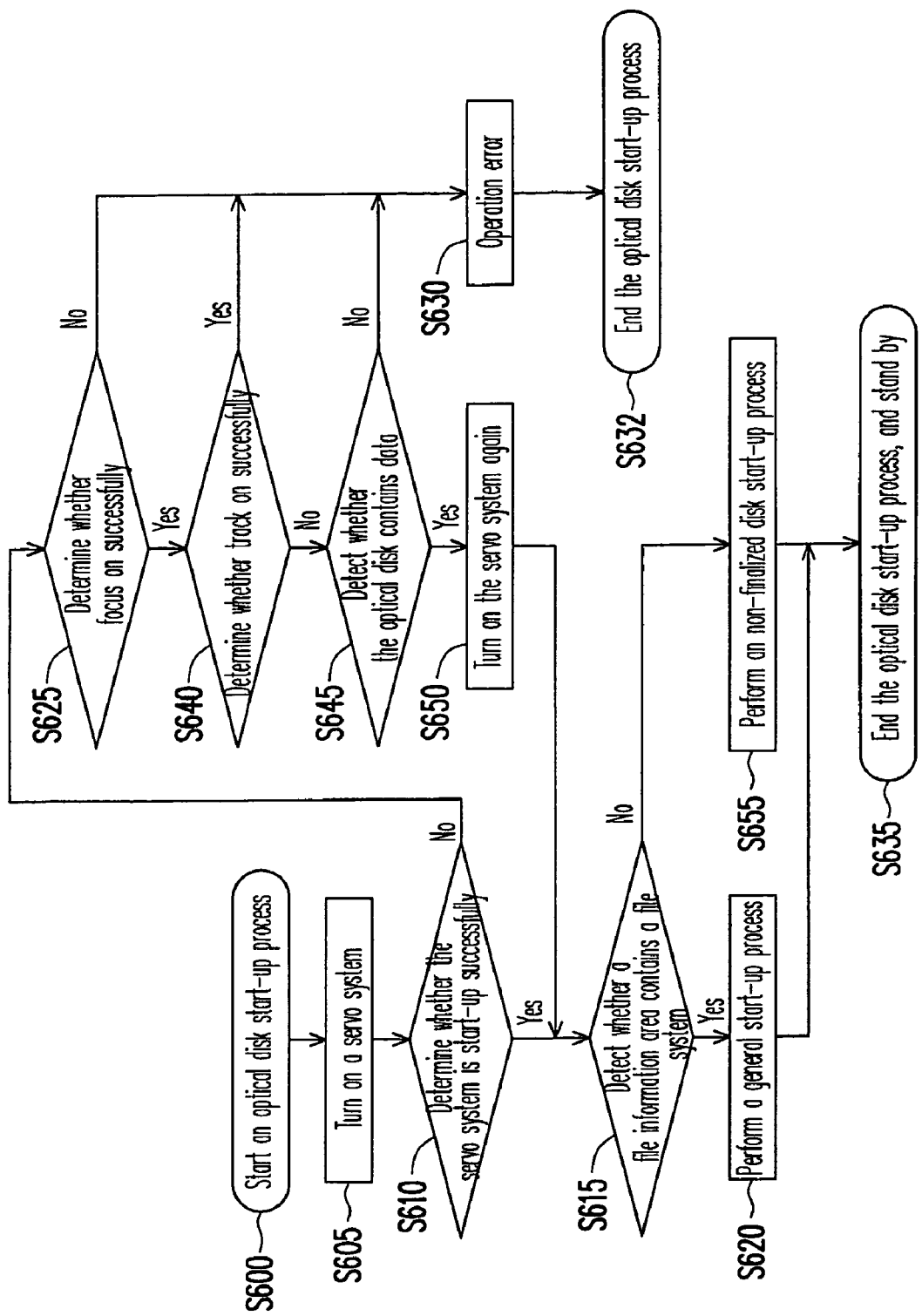
FIG. 6 is a flowchart illustrating a method for determining the completeness of an optical disc according to an embodiment of the present invention.

FIG. 6 is a flowchart illustrating a method for determining the completeness of an optical disc according to an embodiment of the present invention. When an optical disc is placed into a read-only optical disc drive or a read-only disc player, an optical disc start-up process is started (step S600). First, a servo system of the read-only optical disc drive is turned on (step S605). Then, whether the servo system is successfully start-up is determined (step S610). If the servo system is start-up successfully, the read-only optical disc drive continues to detect whether the file information area 530 contains a file system (step S615). If it is determined that the file information area 530 contains a file system, the read-only optical disc drive enters a general start-up process (step S620). After that, the read-only optical disc drive ends the startup process and enters a standby state (step S635). Contrarily, if it is determined that the servo system is not successfully start-up in step S610, the read-only optical disc drive continues to execute following steps to determine the completeness of the optical disc.

In an existing read-only optical disc drive, the optical pickup head thereof may perform focusing and tracking actions at a position P1 in the lead-in zone 510 of the optical disc when the servo system is being turned on. If the optical disc in the read-only optical disc drive is a finalized disc, the lead-in zone thereof contains data, and accordingly, the optical pickup head can focus on and track on the finalized disc successfully and the servo system can be start-up successfully. In the present embodiment, if the optical disc in the read-only optical disc drive is the non-finalized disc 500, the optical pickup head cannot focus on and track on the non-finalized disc successfully in the lead-in zone 510 which contains no data. Accordingly, when the servo system is not start-up successfully, the read-only optical disc drive does not determine an operation error as in the conventional technique; instead, the read-only optical disc drive continues to execute following steps to determine the completeness of the optical disc.

When the servo system is not turned on successfully, the read-only optical disc drive first determines whether the optical pickup head performs the focusing action successfully (step S625), in other words, determines whether the optical pickup head focuses on the optical disc correctly. Regarding present optical disc technique, it is determined that an optical disc is placed in the read-only optical disc drive if the optical pickup head performs the focusing action successfully, and it is determined that no optical disc is placed in the read-only optical disc drive and an operation error occurs if the focusing action of the optical pickup head fails (step S630). Meanwhile, the optical disc start-up process is terminated (step S632).

If the optical pickup head performs the focusing on step successfully in step S625, whether the optical pickup head can successfully perform a tracking action to the optical disc is determined (step S640), in other words, read-only optical disc drive determines whether the optical pickup head tracks on the optical disc correctly. If the tracking action of the optical pickup head succeeds, it is determined that the optical pickup head can focus and track an optical disc. However, since it has been determined that the servo system is not successfully turned on in step S610, the read-only optical disc drive determines that an operation error occurs (step S630) and terminates the optical disc start-up process (step S632) if the tracking action of the optical pickup head succeeds in step S640.

Contrarily, if the tracking action of the optical pickup head fails, the read-only optical disc drive searches the optical disc to determine whether the optical disc contains data (step S645). In the present embodiment, the optical pickup head cannot track the optical disc because the optical pickup head is at position P1 in the lead-in zone 510 and the lead-in zone of the non-finalized disc contains no data. After determining that the tracking action fails, the optical pickup head is moved from position P1 toward outside of the optical disc along the normal L and detects whether the optical disc contains data. In the present embodiment, whether the optical disc contains data may be detected by reading a servo signal while moving the optical pickup head outwards and determining whether the optical disc contains data according to the variation of the servo signal. The servo signal may be a radio frequency (RF) signal, a RF envelope signal, a sub beam additive signal, or a tracking error signal.

If the optical pickup head still does not detect any data after it is moved to the outmost side of the optical disc along the normal L, the read-only optical disc drive determines that an operation error occurs (step S630) and terminates the optical disc start-up process (step S632).

Contrarily, if it is determined that the optical disc contains data through the method described above, the read-only optical disc drive turns on the servo system again (step S650). Since the optical pickup head is at a position P2 where data is recorded, the servo system can be successfully start-up, and the read-only optical disc drive starts to turn the optical disc and performs focusing and tracking actions again. Next, the read-only optical disc drive detects whether the file information area 530 contains a file system (step S615). If the file information area 530 does not contain any file system, the optical disc is determined to be a non-finalized disc, and a start-up process is performed to the non-finalized disc (step S655). Finally, the read-only optical disc drive ends the start-up process and enters a standby state to wait for system instruction (step S635).

Figure 7:
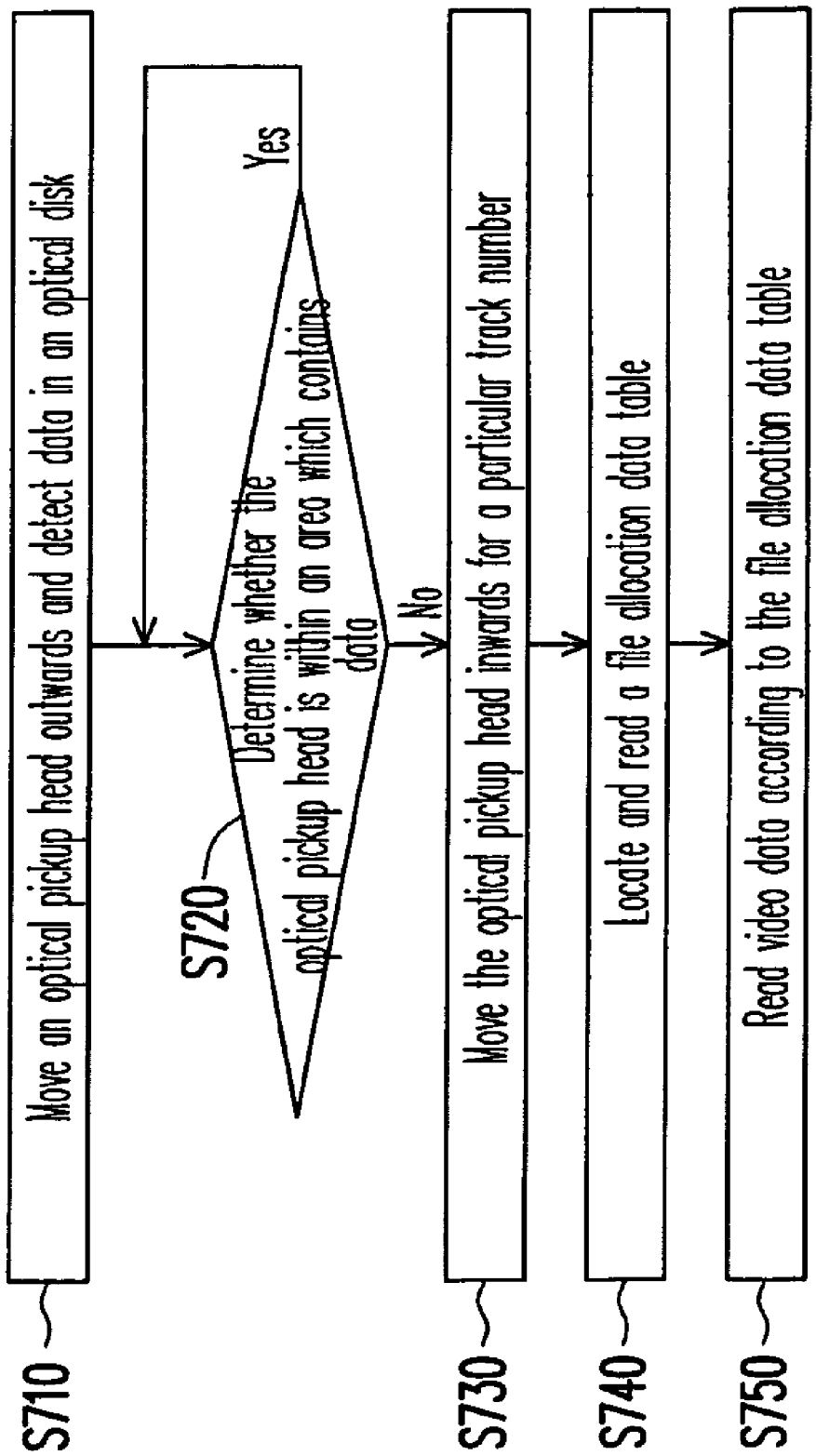
FIG. 7 is a flowchart illustrating a method for playing an optical disc according to an embodiment of the present invention.

In another embodiment of the present invention, a method for reading an non-finalized disc is provided, wherein the method is suitable for a read-only disc player to play video data in a non-finalized disc. Referring to FIG. 7 and FIG. 5, when the read-only optical disc drive is in a standby state and receives a system instruction for playing the optical disc, the optical pickup head is moved outwards from the file information area 530 along the normal L, and at the same time, the optical pickup head detects data in the optical disc according to the servo signal (step S710). Next, whether the optical pickup head is still within the area containing data is determined (step S720). If the optical pickup head is still within the area containing data, for example, the read-only disc player determines that the optical pickup head is still within the area containing data if the optical pickup head is moved to a position P3, and the process returns to step S710 so that the optical pickup head is moved outwards continuously.

If the optical pickup head is moved to a position P4 on the optical disc, namely, outside of the area containing data, the optical pickup head is moved inwards for a particular track number (step S730) so that the optical pickup head is back to a position P5 on the optical disc. Regarding the present optical disc format, since the data size in the file allocation data table 542 is fixed, the file allocation data table 542 occupies a fixed track number on the optical disc. In other words, when the optical pickup head finds out the external boundary of the area containing data on the optical disc, the optical pickup head is moved inwards for a particular track number to locate the starting track of the file allocation data table 542. Taking the non-finalized disc in FIG. 5 as an example, the starting track of the file allocation data table 542 is at the position P5.

Thereafter, when the optical pickup head is moved to the starting track of the file allocation data table 542, the optical pickup head locates and reads the file allocation data table 542 (step S740). The read-only disc player obtains the position of the video data 541 in the optical disc according to the file allocation data table 542. Accordingly, in step S750, the read-only disc player moves the optical pickup head according to the file allocation data table 542 so as to read the video data 541 (step S750).

As described above, in the present invention, a file allocation data table 542 is located in the video data area 540 in order to read the data in the optical disc if the file information area 530 in the optical disc does not contain any file system. In other words, in the present invention, data in an optical disc to which no finalized action is performed can also be read by a read-only disc player. The file allocation data table in DVD format is a virtual allocation table (VAT), and the file allocation data table in DVD+R format is a reserved space allocation table (RSAT).

Even though an optical disc in DVD format is described in the foregoing embodiment, other types of optical discs have similar data distribution as DVD and accordingly those having ordinary knowledge in the art can also apply the present invention to other types of optical discs.

As described in the foregoing embodiment, in the present invention, the read-only disc player will not determine an operation error after the tracking on action thereof fails; instead, the read-only disc player continues to detect whether the optical disc contains any video data and whether a file information area contains any file system. In addition, if the read-only disc player detects that the optical disc contains video data, the read-only disc player starts a mechanism for reading non-finalized discs so that the read-only disc player can read data from the non-finalized disc.

In order to allow those having ordinary knowledge in the art to embody the present invention according to the present disclosure, two methods for detecting whether a file information area contains any file system as in the step S615 will be described. However, these two methods are not intended for limiting the scope of the present invention. The detailed steps of these two methods are respectively illustrated in FIG. 8 and FIG. 9.

Figure 8:
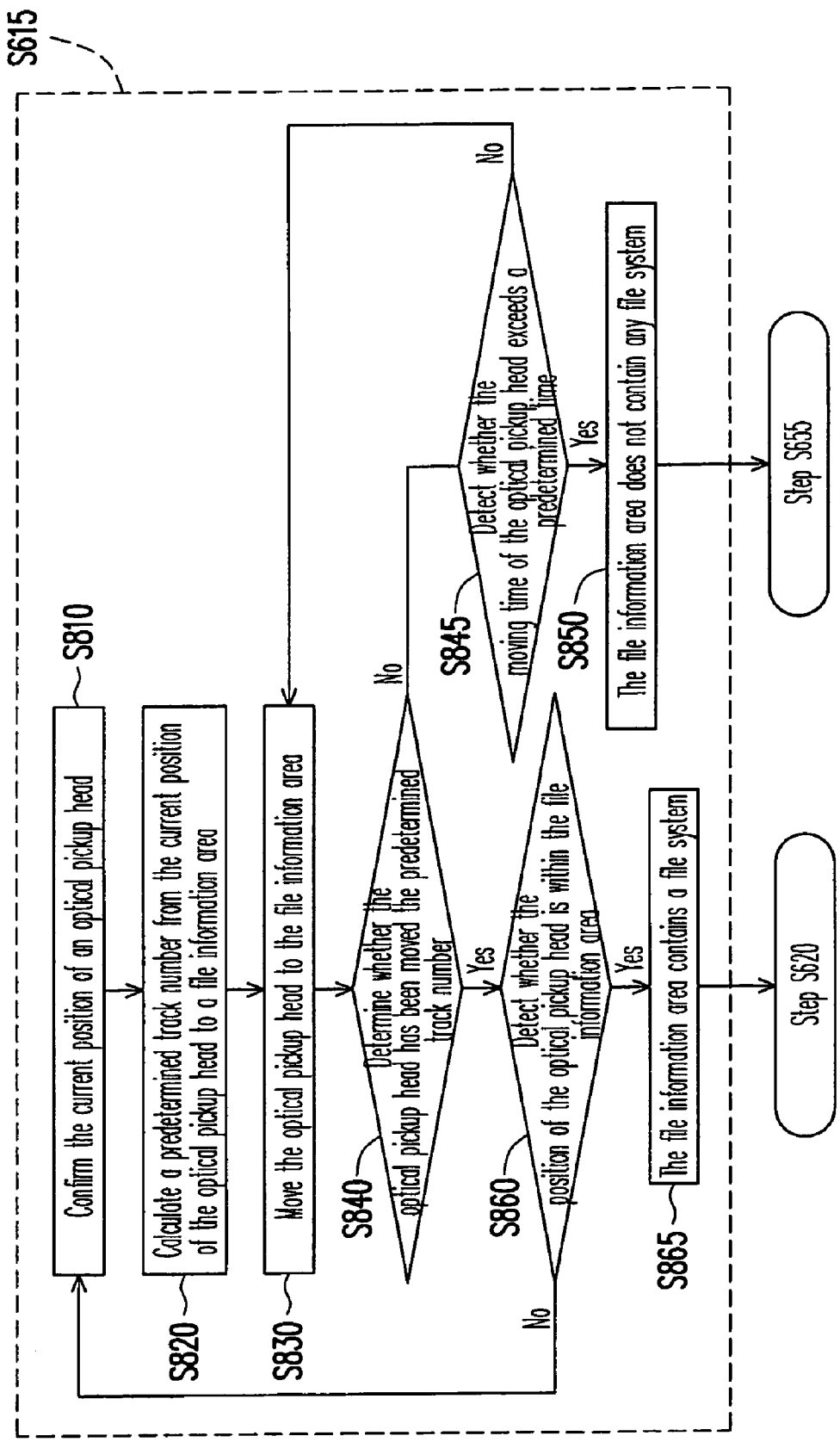
FIG. 8 is a flowchart of detailed steps in step S615 in FIG. 6.

FIG. 8 is a flowchart of detailed steps in step S615 in FIG. 6. Referring to FIGS. 5, 6, and 8, first, the current position of the optical pickup head is confirmed (step S810). As described in step S650, the optical pickup head is at position P2. In the present embodiment, the position P2 may be within an area containing data. According to existing optical disc technique, the read-only optical disc drive can perform a tracking action to an area and obtain the current position of the optical pickup head as long as the area contains data. With existing optical disc specification, the position of the optical pickup head in an optical disc may be represented with an ID or a logical block address (LBA).

Next, the read-only optical disc drive calculates a predetermined number of tracks from the current position of the optical pickup head to the file information area 530 (step S820). Since the optical disc drive has obtained the ID position or LBA position of the file information area, the read-only optical disc drive can calculate the predetermined number of tracks from the current position of the optical pickup head to the file information area once the read-only optical disc drive obtains the current position of the optical pickup head.

Next, the optical pickup head is moved toward the file information area 530 (step S830). Whether the optical pickup head has been moved across the predetermined number of tracks is determined (step S840). If the optical pickup head has not been moved across the predetermined number of tracks, the read-only optical disc drive checks whether the moving time of the optical pickup head exceeds a predetermined time (step S845). If the moving time of the optical pickup head does not exceed the predetermined time, the process returns to the step S830 so that the optical pickup head can be moved toward the file information area 530 continuously. If the moving time of the optical pickup head exceeds the predetermined time, it is determined that the file information area 530 does not contain the file system (step S850).

In step S830 of the present embodiment, if the optical disc is a non-finalized disc, when the optical pickup head is moved to the file information area 530, the optical pickup head cannot perform tracking action to the file information area 530 because the file information area 530 contains no data. Accordingly, the number of tracks the optical pickup head has been moved across cannot be calculated. Thus, in step S840, the optical pickup head can never be moved up across the predetermined number of tracks. Once the moving time thereof exceeds the predetermined time, the read-only optical disc drive determines that the file information area 530 does not contain any file system.

However, if it is determined that the optical pickup head has been moved across the predetermined number of tracks in step S840, whether the position of the optical pickup head is within the file information area is detected (step S860). If the position of the optical pickup head is not within the file information area, step S810 is re-executed in order to re-calculate the track number from the current position of the optical pickup head to the file information area, and again the optical pickup head is moved from the current position thereof to the file information area. If the position of the optical pickup head is within the file information area, then it is determined that the file information area contains the file system (step S865).

Another method for determining whether the file information area contains a file system is illustrated in FIG. 9. FIG. 9 is a flowchart of detailed steps in step S615 in FIG. 6. First, the optical pickup head is moved toward inside of the optical disc (step S910). Next, whether the optical pickup head is within an area which contains data is determined (step S920). If the optical pickup head is within an area containing data, the process returns to step S910 so that the optical pickup head is moved toward inside of the optical disc continuously. In other words, the optical pickup head is continuously moved toward inside of the optical disc if the optical pickup head is still at a position where data can be read.

Once the position of the optical pickup head is moved out of the area which contains data or the tracking action of the optical pickup head fails, the optical pickup head is moved outwards from its current position (i.e. from where the tracking action fails) until the tracking action succeeds (step S930). In other words, the optical pickup head is gradually moved toward outside of the optical disc until the optical pickup head is within an area containing data. When the tracking action of the optical pickup head succeeds or the optical pickup head is within an area containing data, the read-only optical disc drive determines whether the current tracking position of the optical pickup head is within the file information area 530 (step S940). If the current tracking position of the optical pickup head is within the file information area 530, it is determined that the file information area 530 contains a file system (step S950). If the current tracking position of the optical pickup head is not within the file information area 530, it is determined that the file information area 530 does not contain any file system (step S960).

In overview, according to the present invention, the read-only optical disc drive detects whether an optical disc is a non-finalized disc and starts a mechanism for reading non-finalized discs if the tracking action of an optical pickup head fails. Thereby, in the present invention, data in an optical disc can be read by a read-only optical disc drive or a read-only disc player regardless of the completeness of the optical disc. Moreover, as described in the foregoing embodiments, data in the optical disc can be detected while the optical disc is turning, so that the optical pickup head can be moved to a more precise position to detect whether the file information area thereof contains data and accordingly can determine the completeness of the optical disc more precisely.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for determining the completeness of an optical disc used in a read-only optical disc drive or a read-only disc player, wherein the optical disc comprises a file information area, the method comprising:
   turning on a servo system;
   determining whether a focusing on and a tracking on are successful if the servo system is not start-up successfully;
   detecting whether the optical disc contains data if the focusing on succeeds while the tracking on fails;
   spinning the optical disc and determining whether the file information area contains a file system if the optical disc contains data; and
   determining that the optical disc is a non-finalized disc if the file information area does not contain the file system.

2. The method according to claim 1, wherein the step of detecting whether the optical disc contains data comprises:
   moving an optical pickup head outwards from inside of the optical disc to receive a servo signal; and
   determining whether the optical disc contains data according to the variation of the servo signal.

3. The method according to claim 2, wherein if the optical disc contains data, a servo system is turned on again in order to perform a focusing on and a tracking on to an area which contains the data in the optical disc, and after the servo system is successfully turned on, the optical disc is spun and whether the file information area contains the file system is determined.

4. The method according to claim 2, wherein the step of determining whether the file information area contains the file system comprises:
   a. confirming the current position of the optical pickup head;
   b. calculating a predetermined number of tracks from the current position of the optical pickup head to the file information area;
   c. moving the optical pickup head toward the file information area; and
   d. detecting whether the position of the optical pickup head is within the file information area when the optical pickup head is moved across the predetermined number of tracks; wherein
      d1. re-performs steps a, b, c, and d if the position of the optical pickup head is not within the file information area; and d2. determines that the file information area contains the file system if the position of the optical pickup head is within the file information area.

5. The method according to claim 4, wherein before the step d, the method further comprises:
determining whether the optical pickup head is moved across the predetermined number of tracks;
detecting whether the moving time of the optical pickup head exceeds a predetermined time if the optical pickup head is not moved across the predetermined number of tracks; and
determining that the file information area does not contain the file system if the moving time of the optical pickup head exceeds the predetermined time.

6. The method according to claim 2, wherein the step of determining whether the file information area contains the file system comprises:
moving the optical pickup head toward inside of the optical disc until the tracking on fails;
moving the optical pickup head from where the tracking on fails toward outside of the optical disc until the tracking on succeeds;
determining that the file information area contains the file system if the tracking position of the optical pickup head is within the file information area; and
determining that the file information area does not contain the file system if the tracking position of the optical pickup head is not within the file information area.

7. The method according to claim 2, wherein the servo signal is a radio frequency (RF) signal, a RF envelop signal, a sub beam additive signal, or a tracking error signal.

8. The method according to claim 1, wherein the optical disc comprises a digital versatile disc (DVD).

9. A method for playing an optical disc used in a read-only optical disc drive, wherein the optical disc comprises a file information area and a video data area, the method comprising:
turning on a servo system;
determining whether a focusing on and a tracking on are successful if the servo system is not start-up successfully;
detecting whether the optical disc contains data if the focusing on succeeds while the tracking on fails;
spinning the optical disc and determining whether the file information area contains a file system if the optical disc contains data; and
reading the outmost data in the video data area to locate a file allocation data table if the file information area does not contain the file system; and
playing data stored in the video data area according to the file allocation data table.

10. The method according to claim 9, wherein the step of locating the file allocation data table comprises:
moving the optical pickup head toward outside of the optical disc until the tracking on fails;
moving the optical pickup head toward inside of the optical disc across a particular number of tracks; and
locating and reading the file allocation data table.

11. The method according to claim 10, wherein the file allocation data table comprises a reserved space allocation table (RSAT) or a virtual allocation table (VAT).

12. The method according to claim 9, wherein the step of detecting whether the optical disc contains data comprises:
moving an optical pickup head outwards from inside of the optical disc to receive a servo signal; and
determining whether the optical disc contains data according to the variation of the servo signal.

13. The method according to claim 12, wherein if the optical disc contains data, a servo system is turned on in order to perform a focusing on and a tracking on to an area containing the data in the optical disc, and after the servo system is successfully turned on, the optical disc is spun and whether the file information area contains the file system is determined.

14. The method according to claim 12, wherein the step of determining whether the file information area contains the file system comprises:
a. confirming the current position of the optical pickup head;
b. calculating a predetermined number of tracks from the current position of the optical pickup head to the file information area;
c. moving the optical pickup head toward the file information area; and
d. detecting whether the position of the optical pickup head is within the file information area when the optical pickup head is moved across the predetermined number of tracks; wherein
d1. re-performs steps a, b, c, and d if the position of the optical pickup head is not within the file information area; and
d2. determines that the file information area contains the file system if the position of the optical pickup head is within the file information area.

15. The method according to claim 14, wherein before step d, the method further comprises:
determining whether the optical pickup head is moved across the predetermined number of tracks;
detecting whether the moving time of the optical pickup head exceeds a predetermined time if the optical pickup head is not moved across the predetermined number of tracks; and
determining that the file information area does not contain the file system if the moving time of the optical pickup head exceeds the predetermined time.

16. The method according to claim 12, wherein the step of determining whether the file information area contains the file system comprises:
moving the optical pickup head toward inside of the optical disc until the tracking on fails;
moving the optical pickup head from where the tracking on fails toward outside of the optical disc until the tracking on succeeds;
determining that the file information area contains the file system if the tracking on position of the optical pickup head is within the file information area; and
determining that the file information area does not contain the file system if the tracking on position of the optical pickup head is not within the file information area.

17. The method according to claim 12, wherein the servo signal is a RF signal, a RF envelop signal, a sub beam additive signal, or a tracking error signal.

* * * * *